US012646174B2

(12) United States Patent
Sabel et al.

(10) Patent No.: US 12,646,174 B2
(45) Date of Patent: Jun. 2, 2026

(54) METHODS, SYSTEMS AND COMPUTER READABLE MEDIUMS FOR LIGHT FIELD VERIFICATION ON A PATIENT SURFACE

(71) Applicant: Varian Medical Systems International AG, Steinhausen (CH)

(72) Inventors: Martin Sabel, Daettwil (CH); Michael Huber, Daettwil (CH)

(73) Assignee: SIEMENS HEALTHINEERS INTERNATIONAL AG, Steinhausen (CH)

( * ) Notice: Subject to any disclaimer, the term of this patent is extended or adjusted under 35 U.S.C. 154(b) by 414 days.

(21) Appl. No.: 17/883,994

(22) Filed: Aug. 9, 2022

(65) Prior Publication Data

US 2024/0054646 A1    Feb. 15, 2024

(51) Int. Cl.
*G06T 7/00* (2017.01)

(52) U.S. Cl.
CPC .. *G06T 7/0014* (2013.01); *G06T 2207/10052* (2013.01)

(58) Field of Classification Search
CPC ............. G06T 7/0014; G06T 2207/10052
See application file for complete search history.

(56) References Cited

U.S. PATENT DOCUMENTS 5,438,991 A * 8/1995 Yu ........................ A61N 5/1049
                                                              378/65
7,623,623 B2 * 11/2009 Raanes ................ A61B 6/4458
                                                              378/68

| | | | |
|---|---|---|---|
| 11,058,393 B2 | 7/2021 | Wiggers et al. | |
| 2007/0003123 A1 * | 1/2007 | Fu | G06T 7/38 604/20 |
| 2011/0204262 A1 | 8/2011 | Pu et al. | |
| 2012/0230462 A1 * | 9/2012 | Robar | A61B 6/4085 378/65 |
| 2014/0330417 A1 * | 11/2014 | Keane | A61B 90/18 700/98 |
| 2015/0352376 A1 * | 12/2015 | Wiggers | A61B 6/586 378/207 |
| 2019/0105514 A1 | 4/2019 | Amstutz et al. | |
| 2019/0209866 A1 * | 7/2019 | Kim | A61B 5/0077 |

OTHER PUBLICATIONS

European Search Report Opinion (Year: 2022).*

* cited by examiner

*Primary Examiner* — Stephen S Hong
*Assistant Examiner* — Carl E Barnes, Jr.
(74) *Attorney, Agent, or Firm* — Harness, Dickey & Pierce, P.L.C.

(57) ABSTRACT

At least one example embodiment provides a method including obtaining a first image, the first image including a light field on a patient, the light field being generated by a treatment system; obtaining a treatment plan outline, the treatment plan outline including an area of the patient for a treatment; determining positioning information based on the first image and the treatment plan outline, the positioning information including an indicator of a position of the treatment system with respect to the patient; and controlling the treatment system based on the positioning information.

16 Claims, 14 Drawing Sheets

515

OBTAIN FIRST IMAGE — S705

OBTAIN TREATMENT PLAN OUTLINE — S710

DETERMINE POSITION INFORMATION — S715

CONTROL TREATMENT SYSTEM — S720

S705a

ACTIVATE LIGHT FIELD

S705

S705b

ACQUIRE IMAGE OF LIGHT FIELD

S705c

DETECT LIGHT FIELD OUTLINE

OBTIAN TREATMENT PLAN OUTLINE

S710

S715a

PROJECT PLAN OUTLINE ONTO FIRST IMAGE

S715

S715b

COMPARE DETECTED OUTLINE TO PLAN OUTLINE

CONTROL TREATMENT SYSTEM

S720

METHODS, SYSTEMS AND COMPUTER READABLE MEDIUMS FOR LIGHT FIELD VERIFICATION ON A PATIENT SURFACE

TECHNICAL FIELD

One or more example embodiments relate to methods, systems and computer readable mediums for light field verification on a patient surface, such as a 3D patient surface image.

BACKGROUND

Radiation therapy involves medical procedures that selectively expose certain areas of a human body, such as cancerous tumors, to doses of radiation. The radiation therapy irradiates the targeted biological tissue such that undesirable tissue is destroyed. Radiation has also been-used to obtain images of tissue for diagnostic or treatment purposes.

On treatment delivery systems, a light field projected through the beam collimation is used to verify the patient setup or to check a multi-leaf collimator (MLC) shape for a given beam. The light field setup is a visual process done by a user of the treatment delivery system (e.g., a therapist).

The user may be able to verify the patient setup for a first light field of a treatment as part of the setup before starting the treatment. However, the same verification process for following fields in the treatment require an interruption of the treatment during which the user has to enter the treatment room.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

Current treatment systems do not provide independent verification of the light field projected onto the skin of a patient. Moreover, the verification process for following light fields in the treatment subsequent to the first light field require an interruption of the treatment during which the user has to enter the treatment room.

At least some example embodiments provide an independent verification of the light field.

According to at least one example embodiment, a method includes obtaining a first image, the first image including a light field on a patient, the light field being generated by a treatment system; obtaining a treatment plan outline, the treatment plan outline including an area of the patient for a treatment; determining positioning information based on the first image and the treatment plan outline, the positioning information including an indicator of a position of the treatment system with respect to the patient; and controlling the treatment system based on the positioning information.

According to at least one example embodiment, the method further includes obtaining a three-dimensional (3D) reference surface, the treatment plan outline being projected on the 3D reference surface, wherein the obtaining the first image includes detecting an outline of the light field on the patient, and the determining the positioning information includes projecting the treatment plan outline onto the first image, the positioning information being based on the outline of the light field on the first image and the treatment plan outline on the first image.

According to at least one example embodiment, the determining the positioning information includes comparing the treatment plan outline on the first image and the outline of the light field on the first image, the positioning information being based on the comparing.

According to at least one example embodiment, the first image is a two-dimensional (2D) image.

According to at least one example embodiment, the projecting the treatment plan outline includes registering the 3D reference surface to the first image.

According to at least one example embodiment, the treatment system includes a collimator and the method further includes projecting the light field through the collimator and onto the patient.

According to at least one example embodiment, the method further includes generating a command to generate the light field, the command being generated external to the treatment system.

According to at least one example embodiment, the obtaining the first image includes capturing the first image using a camera of the treatment system.

According to at least one example embodiment, the controlling includes preventing the treatment when the positioning information is greater than or equal to a threshold.

According to at least one example embodiment, the controlling includes performing the treatment on the patient when the positioning information is less than or equal to a threshold.

According to at least one example embodiment, a system includes processing circuitry configured to cause the system to obtain a first image, the first image including a light field on a patient, the light field being generated by a treatment system obtain a treatment plan outline, the treatment plan outline including an area of the patient for a treatment, determine positioning information based on the first image and the treatment plan outline, the positioning information including an indicator of a position of the treatment system with respect to the patient, and control the treatment system based on the positioning information.

According to at least one example embodiment, the processing circuitry is configured to cause the system to obtain a three-dimensional (3D) reference surface, the treatment plan outline being projected on the 3D reference surface, detect an outline of the light field on the patient, and project the treatment plan outline onto the first image, the positioning information being based on the outline of the light field on the first image and the treatment plan outline on the first image.

According to at least one example embodiment, the processing circuitry is configured to cause the system to compare the treatment plan outline on the first image and the outline of the light field on the first image, the positioning information being based on the comparing.

According to at least one example embodiment, the first image is a two-dimensional (2D) image.

According to at least one example embodiment, the processing circuitry is configured to cause the system to register the 3D reference surface to the first image.

According to at least one example embodiment, the system further includes a collimator, the processing circuitry being configured to cause the system to project the light field through the collimator and onto the patient.

According to at least one example embodiment, the processing circuitry is configured to cause the system to generate a command to generate the light field, the command being generated external to the treatment system.

According to at least one example embodiment, the system further includes a camera configured to capture the first image.

According to at least one example embodiment, the processing circuitry is configured to cause the system to prevent the treatment when the positioning information is greater than or equal to a threshold.

According to at least one example embodiment, the processing circuitry is configured to cause the system to perform the treatment on the patient when the positioning information is less than or equal to a threshold.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a particular device, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a device or system to perform the operations discussed herein.

As discussed herein the terminology "one or more" and "at least one" may be used interchangeably.

It will be appreciated that a number of example embodiments may be used in combination.

Figure 1A:
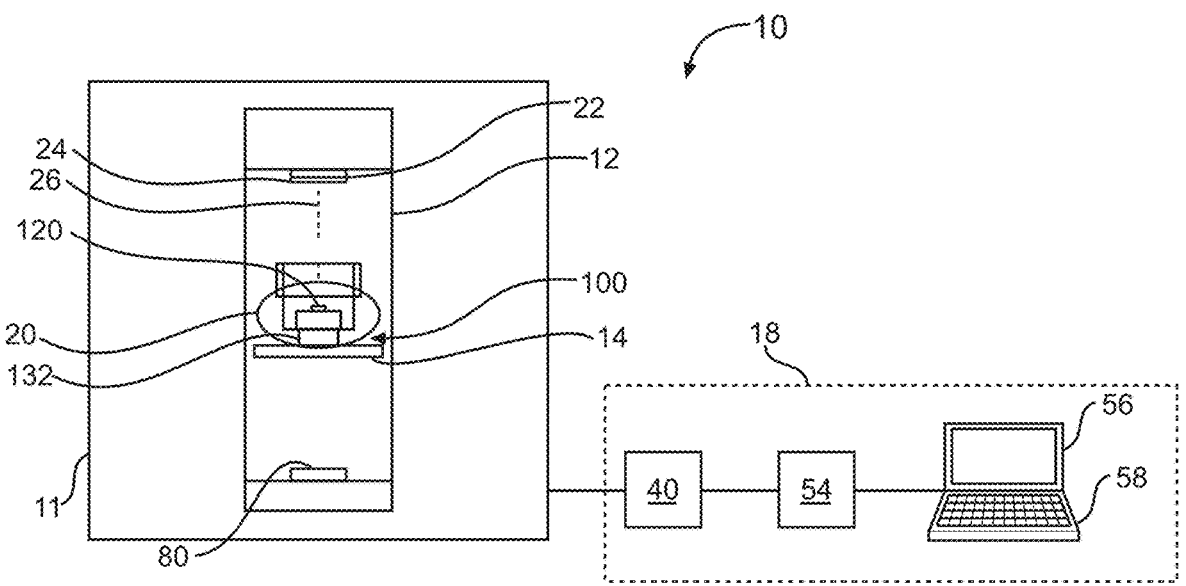
FIGS. 1A-1B illustrates a system according to at least one example embodiment.
Figure 1B:
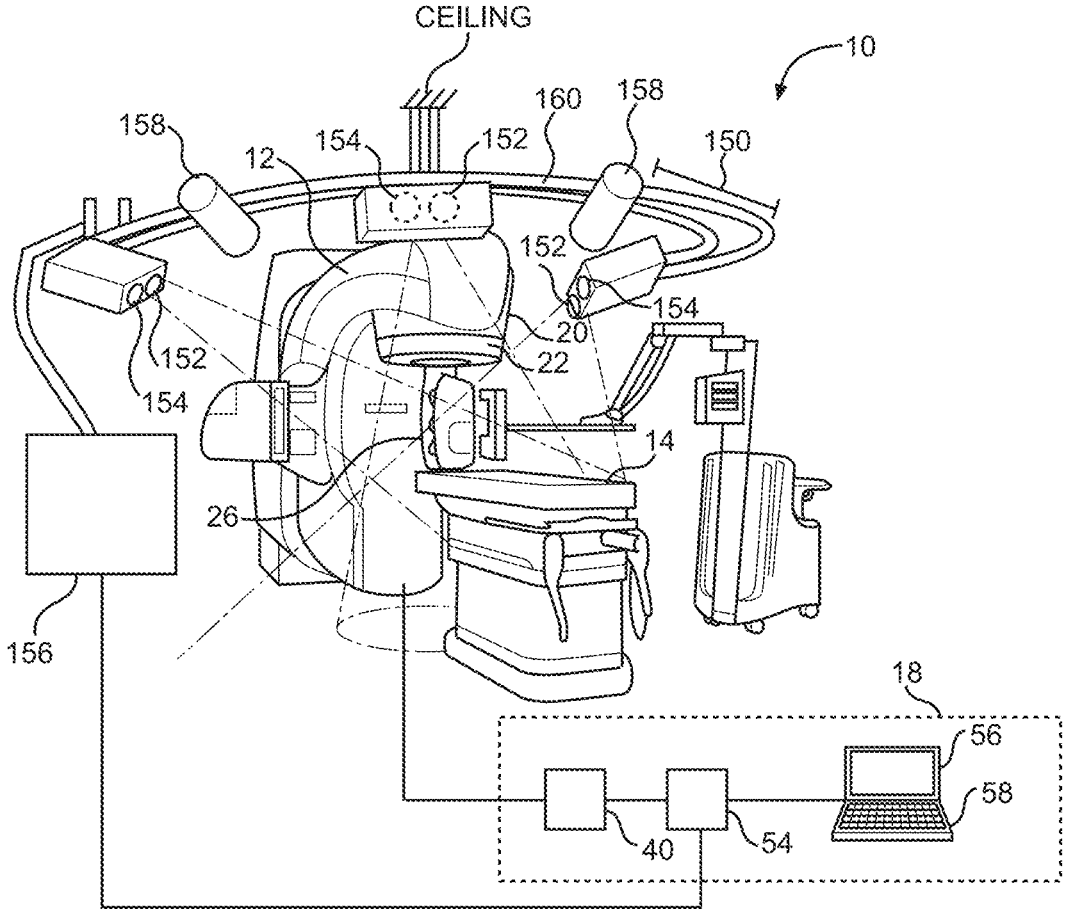

FIGS. 1A-1B illustrate a system according to at least one example embodiment.

FIG. 1A illustrates a medical system 10. In the illustrated embodiment, the medical system 10 is a radiation treatment system, and it includes a medical device 11 and a patient support 14 for supporting a patient 20. The medical device 11 includes an arm gantry 12 and a control system 18 for controlling an operation of the gantry 12 and delivery of radiation. The medical device 11 also includes a radiation source 22 (e.g., a linear accelerator (LINAC)) that projects a beam 26 of radiation towards the patient 20 while the patient 20 is supported on support 14, and the LINAC treatment head 24 for changing a cross sectional shape of the radiation beam 26. The radiation source 22 may be configured to generate a cone beam, a fan beam, or other types of radiation beams in different embodiments. Also, in other embodiments, the source 22 may be configured to generate a proton beam, electron beam, or other form of radiation as known in the art as a form of radiation for treatment purpose. Also, in other embodiments, the system 10 may have other forms and/or configuration. For example, in other embodiments, instead of an arm gantry 12, the medical device 11 may have a ring gantry.

In the illustrated embodiments, the radiation source 22 is a treatment radiation source for providing treatment energy. In other embodiments, in addition to being a treatment radiation source, the radiation source 22 can also be a diagnostic radiation source for providing diagnostic energy for imaging purpose. In such cases, the system 10 will include an imager 80, such as the imager 80, located at an operative position relative to the source 22 (e.g., opposite the treatment head). In further embodiments, the radiation source 22 may be a treatment radiation source for providing treatment energy, wherein the treatment energy may also be used to obtain images. In such cases, in order to obtain images using treatment energies, the imager 80 is configured to generate images in response to radiation having treatment energies. In some embodiments, the treatment energy is generally those energies of 160 kilo-electron-volts (keV) or greater, and more typically 1 mega-electron-volts (MeV) or greater, and diagnostic energy is generally those energies below the high energy range, and more typically below 160 keV. In other embodiments, the treatment energy and the diagnostic energy can have other energy levels and refer to energies that are used for treatment and diagnostic purposes, respectively. In some embodiments, the radiation source 22 is able to provide X-ray radiation at a plurality of photon energy levels within a range anywhere between approximately 10 keV and approximately 20 MeV. In further embodiments, the radiation source 22 can be a diagnostic radiation source. In such cases, the system 10 may be a diagnostic system with one or more moving parts. In the illustrated embodiments, the radiation source 22 is carried by the arm gantry 12. Alternatively, the radiation source 22 may be located within a bore (e.g., coupled to a ring gantry).

In the illustrated embodiments, the control system 18 includes a processing circuitry 54, such as a processor, coupled to an input/output device 40. The control system 18 may also include a monitor 56 for displaying data and an input device 58, such as a keyboard or a mouse, for inputting data. The operation of the radiation source 22 and the gantry 12 are controlled by the processing circuitry 54, which provides power and timing signals to the radiation source 22, and controls a rotational speed and position of the gantry 12, based on signals received from the processing circuitry 54. In some cases, the processing circuitry 54 may also control the LINAC treatment head 24 and the position of the patient support 14. In addition, in some cases, the processing circuitry 54 may be configured to control the beam 26 (e.g., beam hold for gating). Furthermore, the processing circuitry 54 may be configured to control an imaging process (e.g., triggering of imaging). Although the input/output device 40 is shown as a separate component from the gantry 12 and the processing circuitry 54, in alternative embodiments, the input/output device 40 can be a part of the processing circuitry 54.

In some embodiments, the medical system 10 may be a treatment system configured to deliver treatment radiation beam towards the patient 20 at different gantry angles. During a treatment procedure, the source 22 rotates around the patient 20 and delivers treatment radiation beam from different gantry angles towards the patient 20. While the source 22 is at different gantry angles, the LINAC treatment head 24 is operated to change the shape of the beam to correspond with a shape of the target tissue structure. For example, the LINAC treatment head 24 may be operated so that the shape of the beam is similar to a cross sectional shape of the target tissue structure. In another example, the LINAC treatment head 24 may be operated so that different portions of the target tissue structure receive different amounts of radiation (as in an intensity-modulated radiation therapy (IMRT) procedure).

In other embodiments, the medical system 10 may be an imaging system configured to deliver imaging radiation beam towards the patient 20 for imaging the patient 20.

As shown in FIG. 1B, the system 10 also includes an optical system 150. The optical system 150 includes a light source 152, multiple cameras 154 (e.g., stereo cameras), and a processing unit 156 in communication with the cameras 154. In the illustrated example, the light source 152 is configured to provide structured light and/or non-structured light. Also, as shown in the figure, the optical system 150 has three cameras 154. In other embodiments, the optical system 150 may have fewer than three cameras 154 (e.g., one camera 154 or two cameras), or more than three cameras

154. Also, in other embodiments, the optical system 150 may include multiple light sources 152.

Also, in some embodiments, the structured light and/or non-structured light provided by the light source 152 may be in an infrared range (e.g., having infrared wavelength(s)). This technique obviates the need to use very intense light source(s), which may "blind" the patient, particularly during head, neck, and breast treatments in which the light is directed towards the upper part of the patient. In other embodiments, the light source 152 may be configured to provide non-visible light having other wavelengths (e.g., ultraviolet light). Also, use of non-visible light it does not exhibit stroboscopic effects that may confuse the patient, and it does not trigger symptoms of motion thickness.

The optical system 150 may also optionally include a frame 160 to which the cameras 154 and the light source 152 may be mounted. The frame 160 may be mounted to a ceiling and/or a wall of a room in which the medical system 10 is located. Alternatively, the frame 160 may be mounted to the medical system 10. The cameras 154 with the frame 160 may be preassembled at a factory, which allows easy installation at the medical facility. The cameras 154 may be moveably mounted to the frame 160. In one implementation, each of the cameras 154 may be rotatably mounted to the frame 160 (e.g., via a ball joint) so that the camera 154 is rotatable about one or more axes with respect to the frame 160. Similarly, the light source 152 may be moveably mounted to the frame 160. For example, the light source 152 may be rotatably mounted to the frame 160 (e.g., via a ball joint) so that the light source 152 is rotatable about one or more axes with respect to the frame 160. In other embodiments, instead of ball joints, the cameras 154 and the light source 152 may be moveably mounted to the frame 160 using other connectors, such as arms, so that the cameras 154 and the light source 152 are moveable with respect to the frame 160. In other embodiments, the one or more of the cameras 154 and/or the light source 152 may be mounted directly to the medical system 10 or a room.

Furthermore, in other embodiments, instead of having only one light source 152, the optical system 150 may include multiple light sources 152. In some embodiments, each of the light sources 152 may be configured to provide structured light and non-structured light. In other embodiments, one or more of the light sources 152 may be configured to provide structured light, while another one or more of the light sources 152 may be configured to provide non-structured light.

Also, in some embodiments, the light source 152 may be integrated with one or more cameras 154. For example, in one implementation, the optical system 150 may include multiple pods, wherein each pod may have one or more light sources 152 and one or more cameras 154 (e.g., two cameras 154).

As shown in FIG. 1B, the optical system 150 may also include a plurality of time-of-flight (TOF) cameras 158. Each TOF camera 158 is configured to provide depth image(s). A depth image has pixel values representing a distance between a reference point and a surface point detected. In some embodiments, each TOF camera 158 may be an infrared camera. During use, images from the cameras 154 and the TOF cameras 158 are processed by the processing unit 156 to obtain and monitor surface contours of the patient before and during treatment for the purpose of patient setup (absolute positioning and/or relative positioning), patient monitoring during treatment (e.g., monitoring absolute position and/or relative position), tool surveillance, prevention of patient-machine collisions, or a combination of the foregoing. Patient monitoring may include: (1) ensuring that the patient does not leave their setup position, and/or (2) recording a periodic patient motion due to breathing, and controlling a machine accordingly (e.g., beam hold, multileave collimator tracking, tracking of patient support, etc.).

In some cases, the TOF cameras 158 may help increase a field of view, and may observe blind spots not captured by the camera(s) 154.

In other embodiments, the optical system 150 may not include any TOF cameras 158.

In some embodiments, the optical system 150 may include multiple pods, wherein each pod may have one or more light sources 152, one or more cameras 154 (e.g., two cameras 154), and one or more TOF cameras 158. For example, there may be a first pod having one or more light sources 152 and two cameras 154, and a second pod having one or more light source 152 and two cameras 154. In addition, in some embodiments, a pod may include another type or auxiliary camera or depth measurement device. For example, apart from TOF camera, a pod may include ultrasonic distance sensor(s), light sensitive guard(s), or laser scanner(s). In some embodiments, a pod may also include one or more regular video camera(s). In such cases, a processor may obtain information from the regular video camera(s), and merge that information with 3D images. The video cameras may be used to detect markers with known geometric properties to obtain additional geometric 3D information. In further embodiments, the optical system 150 may include a web camera in each pod. In some cases, the image from the web camera or regular video camera may be overlaid on a detected surface or distance map. This may help to define a region of interest. For example, if a user does not see a surface representation of a user interface screen, but can see a realistic photograph of the scene, then the user may still define the region of interest using the user interface.

In some embodiments, the pod(s) may be mounted to a frame of the optical system 150. In other embodiments, the pod(s) may be mounted to a different frame than that of the optical system 150. Also, in further embodiments, the pod(s) may be configured to be mounted to the medical system 10, e.g., to the gantry, to the patient support. In some cases, the pod(s) may be mounted to deployable arms that are coupled to the medical system 10. In other embodiments, the pod(s) may be mounted to a room (e.g., to a wall, a ceiling, a floor, etc.).

The optical system 150 may be configured to provide patient setup, patient monitoring, device monitoring, respiratory motion control, patient-machine collision prevention, or any combination of the foregoing. Thus, in some cases, the same optical system 150 may serve multiple purposes. In some embodiments, different clinical use cases mentioned above may be performed simultaneously. In one implementation, the sequence of real-time input images from the camera(s) 154 and from the TOF camera(s) 158 may be processed by the processing unit 156 to perform patient monitoring and/or device monitoring. Also, in some embodiments, by combining external surface information of the patient (provided by the optical system 150) with x-ray imaging of the internal anatomy, highly integrated and automated treatment workflows may be achieved.

In one method of use, the light source 152 of the optical system 150 may be used to provide structured light. The structured light may be projected onto an object, such as a patient, for patient setup. As used in this specification, when light is described as being projected onto a patient, it is intended to cover the scenario in which the light is projected directly onto the patient (i.e., onto the skin of the patient), as well as the scenario in which the light is projected onto an object worn or coupled to the patient (e.g., onto a garment worn by the patient, a blanket covering the patient, a sticker on the patient, etc.). The cameras 154 sense the structured light as projected on the patient, and generate images of the projected structured light. The processing unit 156 is configured to process the images from the cameras 154, and determine a position (e.g., location and/or orientation) of the patient based on the processed images. Once the position of the patient is determined, the processing unit 156 may determine which direction to move the patient, and how much to move the patient, based on a desired position of the patient to be achieved.

In some cases, a reference image may be obtained by the processing unit 156. The reference image may be generated using the light source 152 and the cameras 154 during a treatment planning session, or on the day of treatment before the treatment session. The reference image includes an image of structured light as projected onto the patient, which indicates a desired position of the patient relative to some coordinate to be achieved. During the patient setup, the light source 152 and the cameras 154 are used to generate an input image. The processing unit 156 compares the input image with the reference image to determine if they match. If not, the patient is then positioned until the input image and the reference image match.

In some embodiments, if the optical system 150 includes one or more TOF cameras (e.g., the TOF cameras 158), the TOF camera(s) may generate one or more depth images. In such cases, the processing unit 156 may use the depth image(s) to perform patient setup. The processing unit 156 may use only the depth image(s) without the optical image(s) from the camera(s) 154. Alternatively, the processing unit 156 may use both depth image(s) and image(s) from the camera(s) 154 to perform patient setup. In one implementation, a reference depth image may be obtained by the processing unit 156. The reference depth image contains information regarding a desired position of a surface of a patient with respect to one or more objects (e.g., a component of the medical system 10, the patient support 14, a wall of the room, etc.) surrounding the patient. The reference depth image may be generated by the TOF camera(s) during a treatment planning session, or on the day of the treatment before the treatment session begins. During a patient setup procedure, the TOF camera(s) provides depth image, which indicates a position of the surface of the patient with respect to one or more objects surrounding the patient. The processing unit 156 compares the depth image with the reference depth image to see if they match. If not, then the patient is positioned until the depth image matches the reference depth image.

Additional functions performed by the medical system 10 are described in U.S. application Ser. No. 15/728,475, the entire contents of which are incorporated by reference.

In other embodiments, the light source 152 provides structured light and directs it onto an object, and the reflected light (e.g., IR light) from the object is measured by image sensors of two lenses of a camera 154 (e.g., a stereo camera) which are offset from the light source 152. The geometry of the light source 152 and the two lenses is known. Accordingly, the processing unit 156 can use triangulation to calculate the distance of surface by finding the same structured pattern in the images from image sensors. The result is a depth map (or distance map), similar to the TOF technology.

In some cases, the light source 152 and the two cameras 154 may be implemented as one pod, and there may be additional pod(s), wherein each pod has a light source and two offset cameras. The processing unit 156 may be configured to add the depth map from one pod to other depth map(s) determined from other pod(s) at other locations in order to map out the surface of the object, thereby forming a larger depth map. In some cases, this depth map may be represented by a point cloud in a defined coordinate system. The processing unit 156 may also calculate the distance of a reference surface to a measured surface to detect a possible offset.

In some embodiments, the structured pattern may be implemented using time-varying gray levels. In such cases, the time-varying gray levels are projected by a light source on the surface to be measured. The processing unit 156 then utilizes an algorithm to find the corresponding pixel in both camera images. Knowing the camera pixel for this surface point and the cameras configuration (e.g., position and/or orientation of each camera in the pod), the angle of the ray towards this object point can be determined by the processing unit 156 for each camera. As the distance between both cameras in the pod is known, triangulation technique may then be used by the processing unit 156 to calculate the distance to this surface point (also known as "distance of surface"). In some embodiments, such distance to the surface point may be measured from the camera pod. The above process may be repeated for all object points to thereby create a depth/distance map, which represents a surface of interest in a known coordinate system.

In one implementation, each of the cameras in a given pod (or image sensors in a single camera) records a series of images with different fringe patterns projected onto the patient/object of interest. From those images, a disparity map is then created by the processing unit 156. A disparity map measures the distance of two corresponding points as seen by the two cameras. These disparity maps are then used by the processing unit 156 to create a 3D ordered point cloud, i.e. a surface information of the object that is seen by both cameras (in a given coordinate system). With multiple pods, such 3D ordered point clouds may be merged to a bigger common surface by the processing unit 156. The bigger common surface is advantageous because it fills gaps of areas that are not seen by one or several pods, and it can increase the overall field of view.

In another implementation, before a treatment session, images of the structured light as projected onto the patient may be generated and recorded as a 4D patient surface.

The optical system 150 may be configured to provide patient setup, patient monitoring, device monitoring, respiratory motion control, patient-machine collision prevention, or any combination of the foregoing. Also, in some embodiments, by combining external surface information of the patient (provided by the optical system 150) with x-ray imaging of the internal anatomy, highly integrated and automated treatment workflows may be achieved.

In a surface-based monitoring workflow, a user manually defines a region-of-interest (ROI) on a 3D surface image of a patient. The ROI is used by a treatment system (e.g., radiotherapy system) to measure motion such as respiratory motion.

Figure 2:
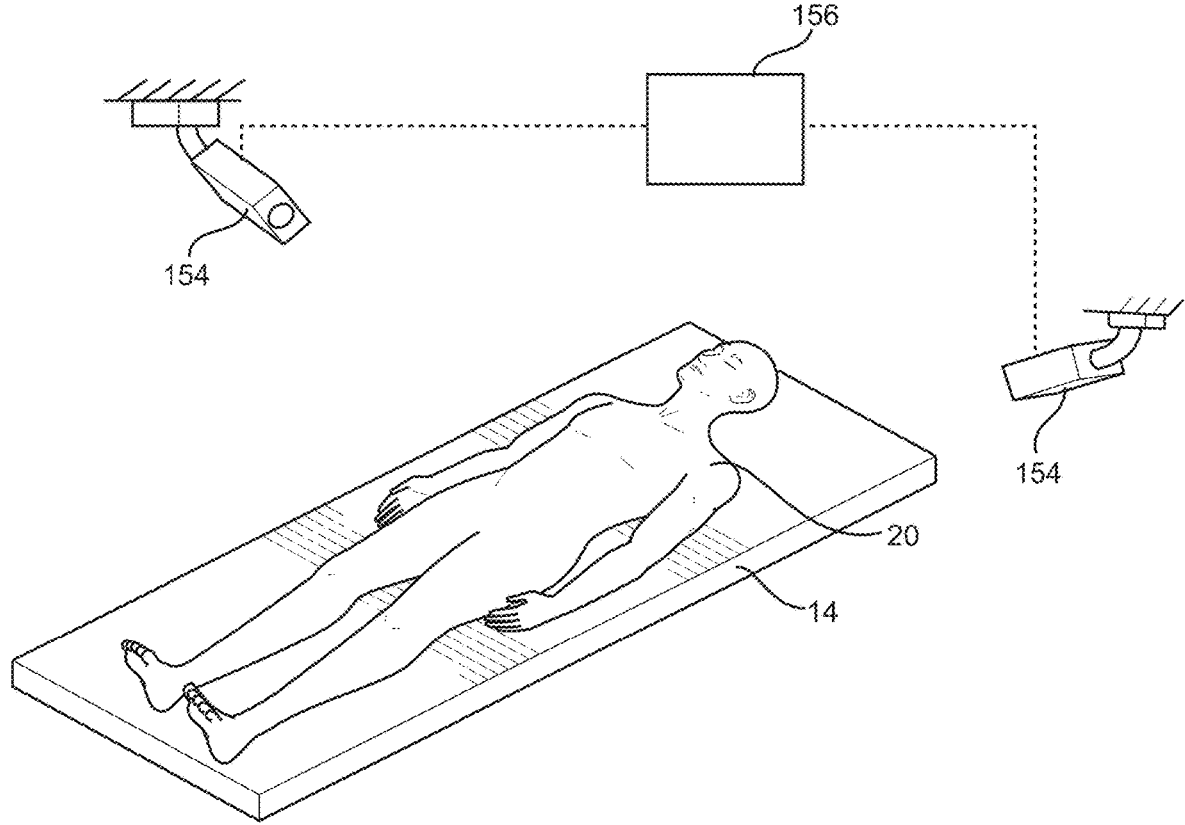
FIG. 2 illustrates an example embodiment of a medical system including two stereo cameras.
Figure 8A:
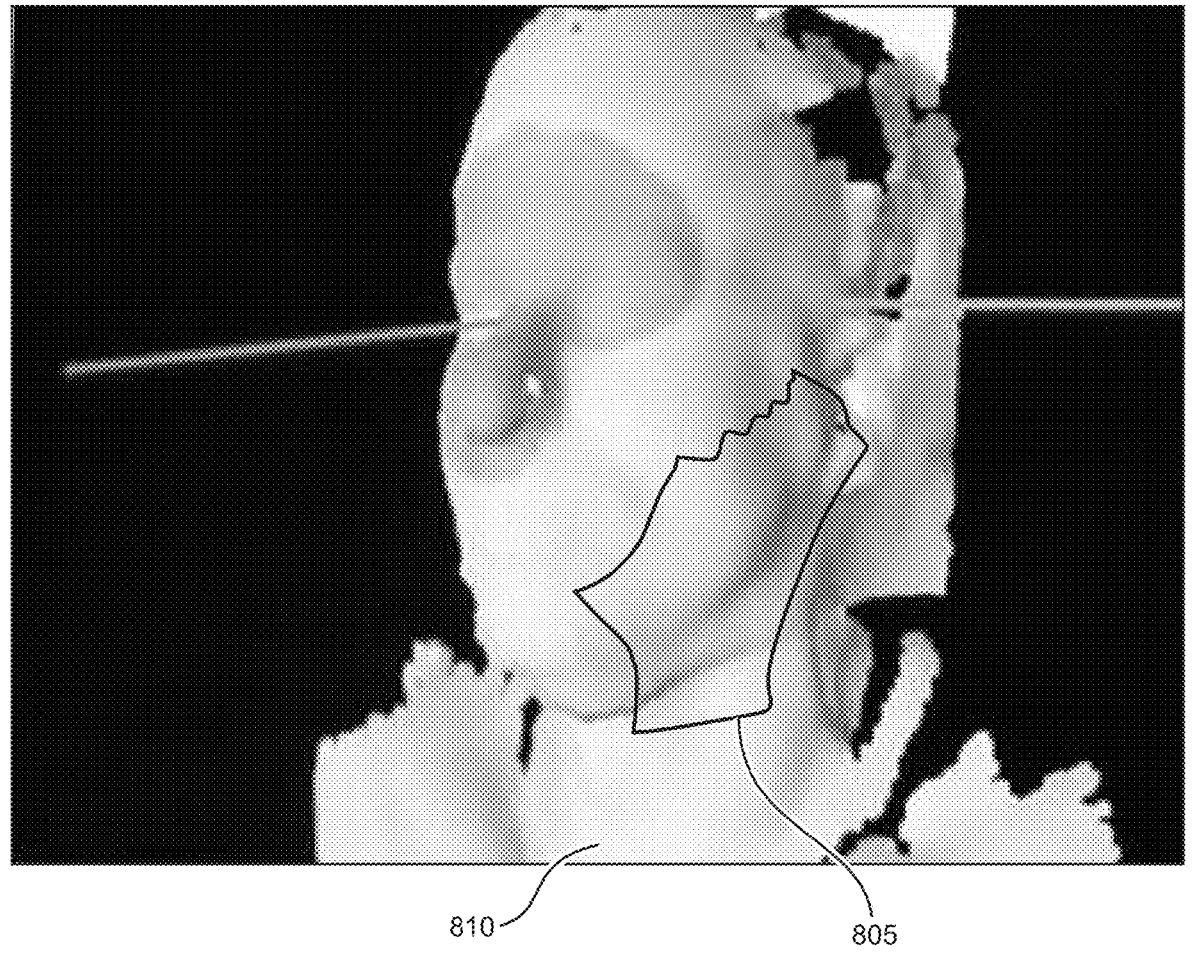
FIG. 8A illustrates a treatment plan outline on a 3D patient surface according to an example embodiment.

FIG. 2 illustrates an example embodiment of a medical system including two stereo cameras configured to produce a 3D patient surface image (e.g., as shown in FIG. 8A). In the example where the cameras are stereo cameras and the number of stereo cameras 154 is two, a surface model of the patient may be formed by combining point clouds from the different cameras 154. The two stereo cameras 154 may be positioned to view opposite sides of a patient 20. In particular, there is a first stereo camera 154 positioned to view the patient 20 from his/her right side, and a second stereo camera 154 positioned to view the patient 20 from his/her left side. In another example, there may be a first camera 154 positioned to view the patient 20 from above his/her head towards a direction of the feet, and a second camera 154 positioned to view the patient 20 from below his/her feet towards a direction of the head. In some embodiments, the processing unit 156 may be configured to receive a first image (e.g., with first depth information) from the first stereo camera 154, and to receive a second image (e.g., with second depth information from the second stereo camera 154. Because the relative position between the two stereo cameras 154 is known, the processing unit 156 may use this positional information to perform coordinate transformation so that the surfaces of the patient 20 from the two images may be combined to form a 3D surface image of the patient.

Similarly, the processing unit 156 and/or processing circuitry 54 may determine a transformation between a frame of reference of the stereo camera and a frame of reference of the radiation source (e.g., LINAC).

In some embodiments, the processing unit 156 may be configured to determine a surface from a point cloud of the entire field of view of a stereo camera 158, or a merged multi-camera view based on expected and/or detected protected surface location and dimension.

Figure 3:
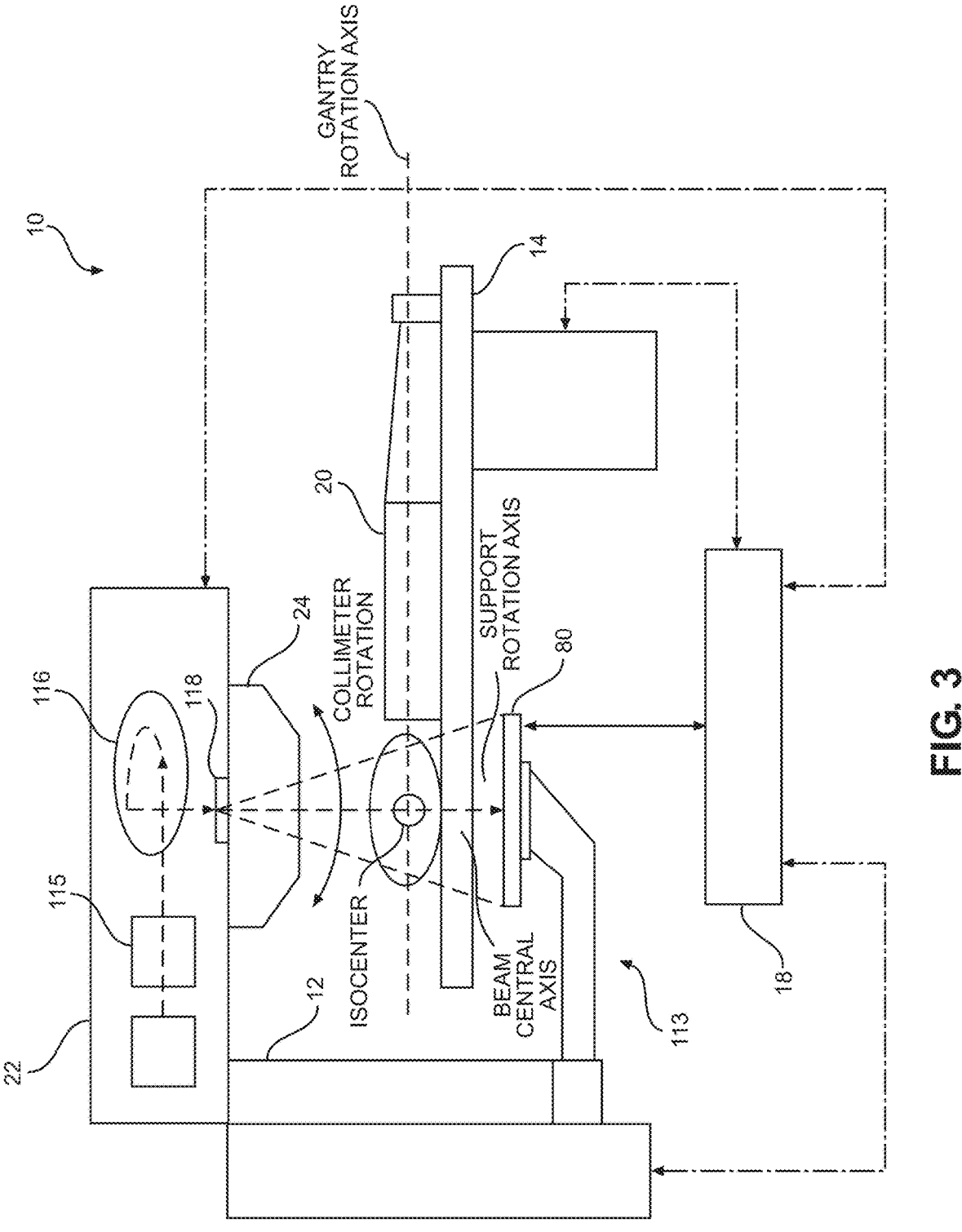
FIG. 3 illustrates an example embodiment of the radiation source and collimator system of FIGS. 1A-1B.

FIG. 3 illustrates an example embodiment of the radiation source of FIGS. 1A-1B. The medical system 10 in FIG. 3 can be configured for dual-mode stereotactic or radiation therapy application, namely, the system 10 can be configured to provide photon-based or electron-beam based radiation treatment to the patient 20 positioned on the patient support 14. The gantry 12 can be a ring gantry (i.e., it extends through a full 360° arc to create a complete ring or circle), but other types of mounting arrangements may also be employed. For example, a static beam, or a C-type, partial ring gantry, or robotic arm can be used. Any other framework capable of positioning the treatment beam source at various rotational and/or axial positions relative to the patient 20 may also be used.

In some embodiments, the gantry 12 is supporting the radiation source 22 which can include an electron gun 114 for generating electron beams and an accelerator waveguide 115 for accelerating the electron beams from the electron gun 114 toward an X-ray target 118 (when the radiation treatment device 103 operates in a photon mode) or toward an electron beam exit window (not shown), when the radiation treatment device 103 operates in an electron-beam mode.

The electron beam exit window allows the electron beam to exit the radiation source 22 and enter the LINAC treatment head 24. The accelerating waveguide 115 is usually mounted parallel to the gantry rotation axis, and thus the accelerated electron beam is bent for it to strike the X-ray target 118 (when device 103 operates in the photon mode) or the exit window (when device 103 operates in an electron-beam mode). An electron beam transport system 116 can include bending magnets, steering coils, trim coils, and a gun cathode heating circuit, and may be used for bending and steering the accelerated electron beams toward the X-ray target 118 or the exit window. The electron beam transport system 116 can bend an electron beam at 90 degrees, 270 degrees (achromatic bending) and at 112.5 degrees (slalom bending) by adjusting the shunt current applied to the bend magnet from a current source (not shown). When the electron pencil beam hits the X-ray target 118, it generates the clinical photon beams (X-rays). The location at which the X-rays are generated is referred to as the radiation beam spot or radiation source.

In operation, electrons originating in the electron gun 114 are accelerated in the accelerating waveguide 115 to the desired kinetic energy and then brought, in the form of a pencil electron beam, through the radiation source 22 into the LINAC treatment head 24, where the clinical photons, such as X-rays, (when the device 103 operates in the photon mode) or the electron beams (when the system 10 operates in the electron-beam mode) are produced. The LINAC treatment head 24 contains several components that influence the production, shaping, localizing, and monitoring of the clinical photon beams, as shown in detail in FIG. 3, or the clinical electron beams.

The system 10 also includes a holding structure 113, which could be a retractable robotic, servo controlled arm, holding the imager 80 for acquiring digital images. The imager 80 can be an electronic portal imaging device (EPID). The holding structure 113 is used to position the imager 80 and allow movement of the imager 80 vertically (along the Z-axis), laterally (along the X-axis), and longitudinally (along the Y-axis).

The control system 18 can, for example, include a radiation delivery module operable to instruct the system 10 to deliver a radiation beam with or without the patient 20 or a calibration phantom in place; an image acquisition module operable to instruct the system 10 to acquire one or more radiation and/or light field images using an electronic portal imaging device (EPID); an image processing module operable to instruct the system 10 to receive and process the images from the imager 80; a determination module operable to instruct the system 10 to determine parameters of the radiation treatment from the acquired images; one or more evaluation modules operable to instruct the system 10 to evaluate the determined parameters; one or more calibration modules operable to instruct the system 10 to calibrate the radiation treatment based on the result of the evaluation; and one or more verification modules operable to instruct system 10 to verify the calibrated parameters of the radiation treatment.

The system 10 also allows capture of all data needed for the image acquisition and evaluation (i.e., data relating to gantry, collimator jaws, MLC, light field source, EPID, EPID arm structure, phantom, filters, scattering foils, X-ray target, dose measuring device, beam steering coils, type of image to be acquired, etc.). Image interpretation to determine and evaluate different parameters and characteristics of the radiation treatment can be performed using different algorithms. The determination of adjustments needed to be made in the control element outputs based on the evaluated parameters and characteristics may also be determined using different algorithms. Once the required adjustments are determined, the necessary tuning and/or calibration and/or verification protocols are automatically sent to the radiation treatment device 103 and the control elements are automatically or manually repositioned/shifted/changed/adjusted until their outputs fall within accepted ranges. FIG. 3 illustrates the radiation beam central axis, the gantry rotation axis, the patient support (i.e., couch) rotation axis, the collimator rotation axis, and the isocenter of system 10.

Figure 4:
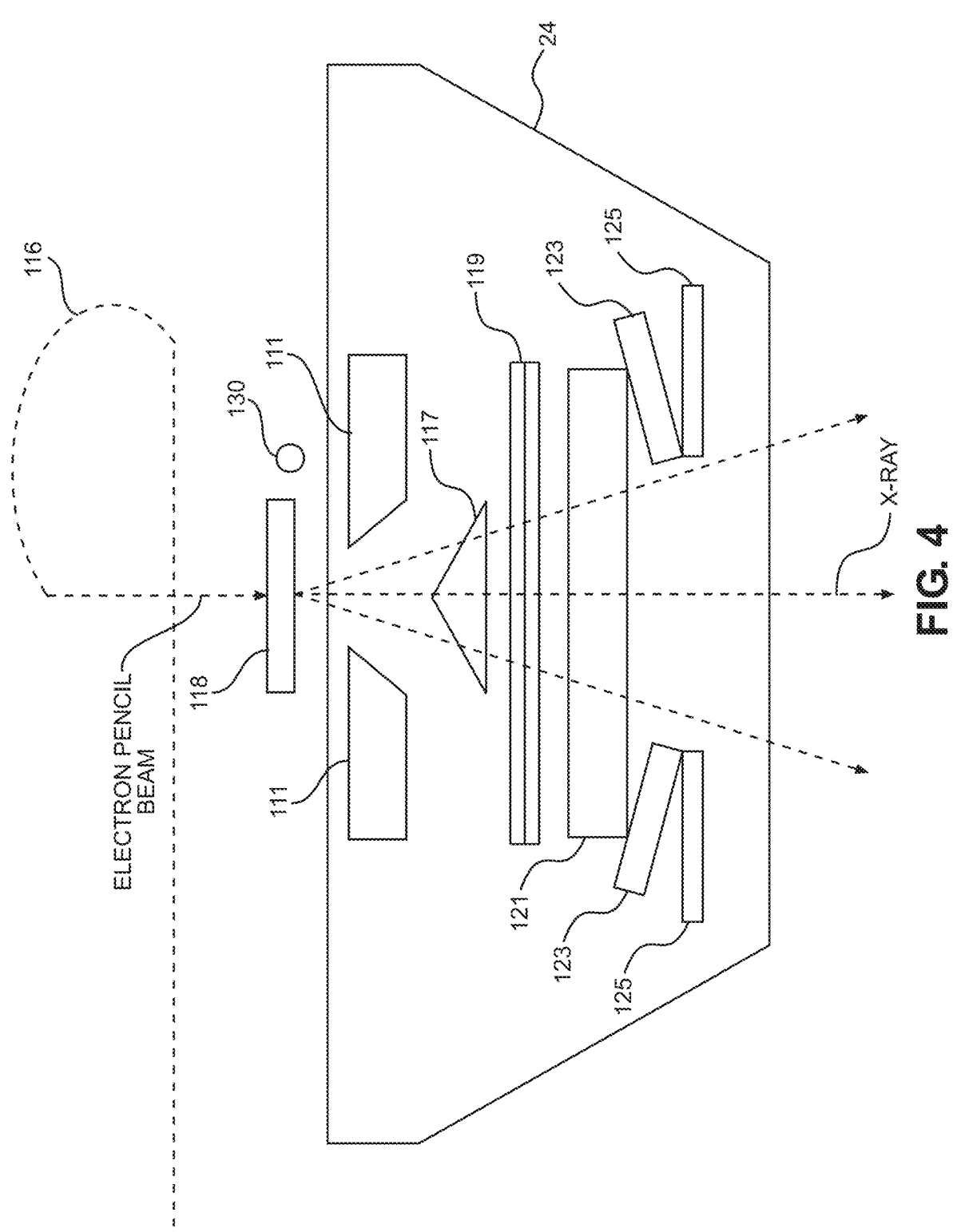
FIG. 4 illustrates a LINAC treatment head of the system shown in FIG. 3 according to an example embodiment.

FIG. 4 illustrates a LINAC treatment head 24 when the radiation source 22 and head 24 operate in a photon mode. The LINAC treatment head 24 can include one or more retractable X-ray targets 118 where clinical photon beams, such as X-rays, are produced, one or more flattening filters 117, which can be mounted on a rotating carousel or sliding drawer for ease of mechanical positioning of the filters 117 into the beam, dual transmission ionization chambers 119, a collimating device (i.e., collimator) including primary collimators 111, adjustable secondary collimators with two upper jaws 121 and two independent lower jaws 123, multi-leaf collimators (MLC) 125, and a field defining light source 130.

Primary collimators 111 define a maximum circular radiation field, which is then further truncated with the adjustable secondary collimators (121, 123) to produce rectangular and square fields at the LINAC isocenter. The primary collimator 111 defines the largest available circular field size and is a conical opening that can be machined into a tungsten shielding block, for example, with the sides of the conical opening projecting on to edges of the X-ray target 118 on one end of the block, and on to the flattening filters 117 on the other end. The thickness of the shielding block is usually designed to attenuate the average primary X-ray beam intensity to less than 0.1% of the initial value. Any other applicable material besides tungsten can also be used.

The secondary beam defining collimators include four blocks, two forming the upper jaws 121 and two forming the lower jaws 123. They can provide rectangular and square fields at the LINAC isocenter, with sides of the order of a few millimeters up to 40 cm. Alternatively, the jaws could be independent asymmetric jaws to provide asymmetric fields, such as one half or three quarter blocked fields in which one or two beam edges are coincident with the beam central axis.

The ionization chamber 119 could be a dual transmission ionization chamber used for monitoring the photon radiation beam output as well as the radial and transverse beam flatness. The ionization chamber 119 acts as an internal dosimeter, and can be permanently imbedded into the LINAC treatment head 24 to continuously monitor the radiation beam output. The ionization chamber 119 could also be sealed to make its response independent of ambient temperature and pressure. The ionization chamber 119 can include a primary and a secondary ionization chamber with the primary chamber measuring monitor units (MUs). Typically, the sensitivity of the chamber electrometry circuitry is adjusted in such a way that 1 MU corresponds to a dose of 1cGy delivered in a water of phantom at the depth of dose maximum on the central beam axis when irradiated with a $10\times10$ cm$^2$ field at a source to surface distance (SSD) of 100 cm. Once the operator preset number of MUs has been reached, the primary ionization chamber circuitry shuts the radiation treatment device 103 down and terminates the dose delivery to the patient 20. Before a new irradiation is initiated, the MU display is reset to zero.

In addition to monitoring the primary dose in MUs, the ionization chamber 119 can also monitor other operating parameters such as the beam energy, flatness and symmetry. Measurements of all of these additional parameters requires that the ionization chamber electrodes of the primary and secondary chambers be divided into several sectors, with the resulting signals used in automatic feedback circuits to steer the electron beam through the accelerating waveguide 115 and the beam transport system 116 and onto the X-ray target 118 or scattering foils, thereby ensuring consistent beam flatness and symmetry.

To produce clinical electron beams from the electron pencil beams, thin scattering foils of a high atomic number (copper or lead, for example) are positioned into the electron pencil beam at the level of the flattening filters 117 in the X-ray mode as described in U.S. Pat. No. 11,058,393, the entire contents of which are incorporated by reference. In addition to the primary collimators 111 and secondary collimators 121, 123, the clinical electron beams also rely on electron beam applicators (cones) for beam collimation. The rest of the collimation and beam shaping elements are the same as in the photon-beam mode.

Multi-leaf collimators (MLC) 125 can be made of 120 movable leaves with 0.5 cm and/or 1.0 cm leaf width, for example. The MLC can be positioned so as to be parallel with the lower jaws 123. For each beam direction, an optimized intensity profile may be realized by sequential delivery of various subfields with optimized shapes and weights. When using MLCs, from one subfield to the next, the leaves may move with the radiation beam on (i.e., dynamic multi-leaf collimation (DMLC)) or with the radiation beam off (i.e., segmented multi-leaf collimation (SMLC)). Such an MLC system can cover fields up to 40×40 cm², for example, and can require 120 individually computer controlled motors and control circuits. Miniature versions of the MLC can also be used. For example, miniature MLCs that project 1.5-6 mm leaf widths and up to 10×10 cm² fields at the LINAC isocenter, could also be used.

The LINAC treatment head 24 can also include a field defining light source 130 to provide a convenient visual method for correctly positioning the patient 20 for treatment using reference marks.

Figure 5:
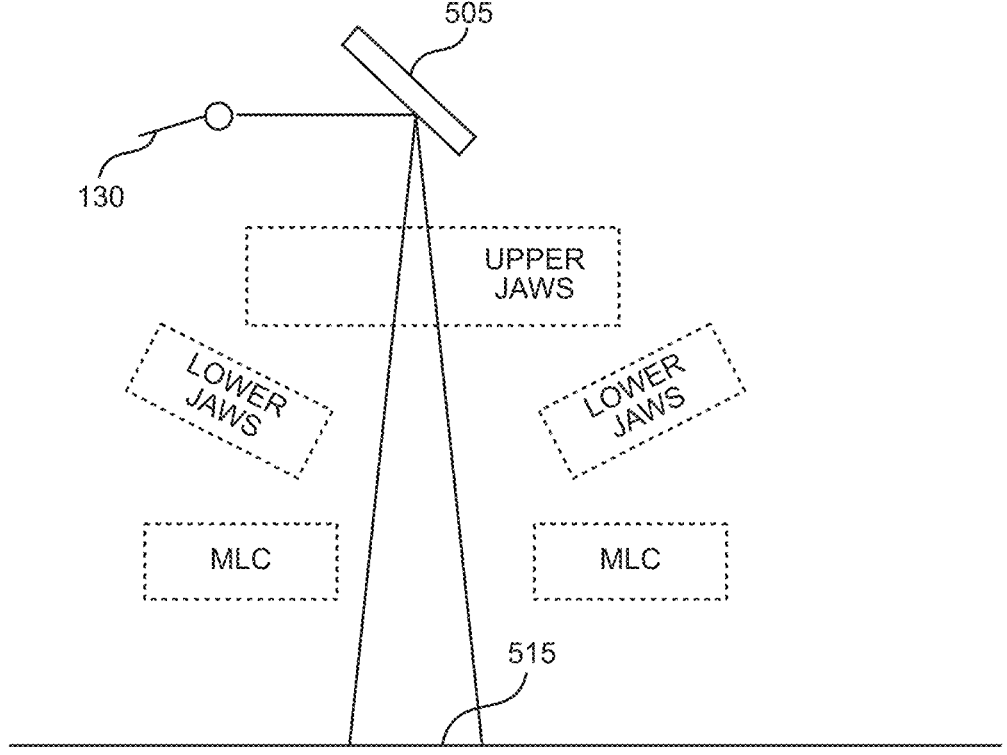
FIG. 5 illustrates an example embodiment of the LINAC treatment head with a field defining light source.

FIG. 5 illustrates an example embodiment of the LINAC treatment head with a field defining light source 130.

The LINAC treatment head 24 can also include a field defining light source 130 to provide a convenient visual method for correctly positioning the patient 20 for treatment using reference marks. The light source 130 may be mounted inside the collimator and can be positioned at the location of the X-ray target 118 by a rotating carousel or a sliding drawer assembly, or it may be positioned to one side of the collimator axis of rotation with the light reflected by a mirror 505. In clinical operations, the light field illuminates an area 515 (shown in FIG. 6) that coincides with the radiation treatment field on the patient's skin.

Current treatment systems do not provide independent verification of the light field projected onto the skin of a patient. Moreover, the verification process for light fields in the treatment subsequent to the first light field require an interruption of the treatment during which the user has to enter the treatment room.

At least some example embodiments provide an independent verification of the light field. Accordingly, as described below, a control system (e.g., control system 18) controls the treatment (e.g., controls a treatment system) based on an alignment of a light field area and a treatment plan outline.

Figure 7A:
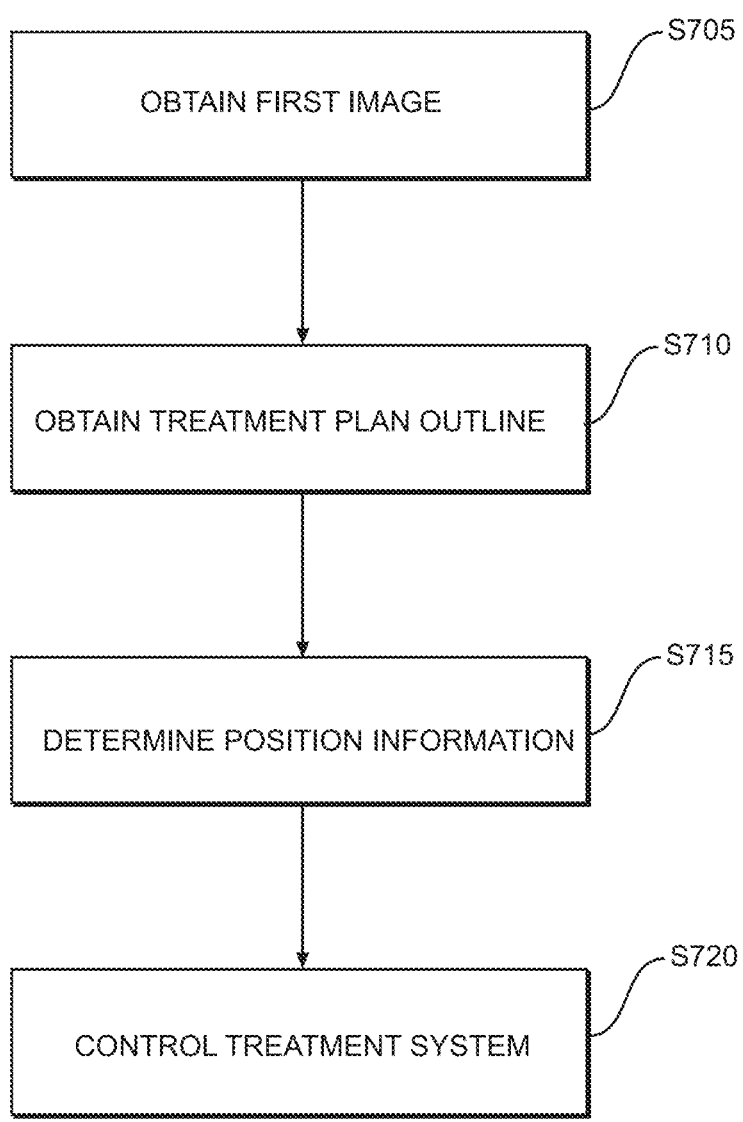
FIG. 7A illustrates a method of controlling a treatment system according to an example embodiment.
Figure 7B:
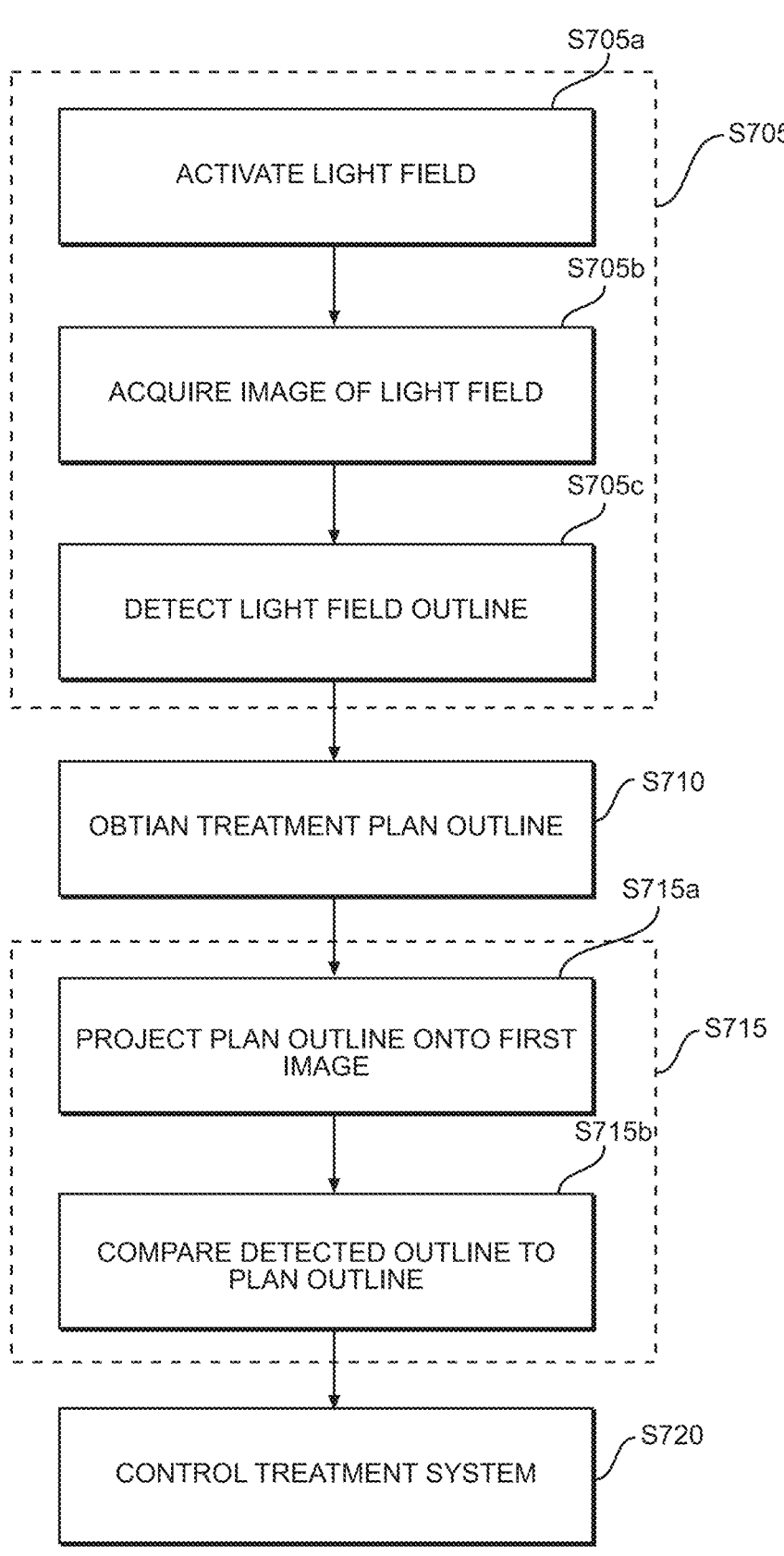
FIG. 7B illustrates a more detailed flow chart of the method shown in FIG. 7A, according to an example embodiment.

FIG. 7A illustrates a method of controlling a treatment system according to an example embodiment. FIG. 7B illustrates a more detailed flow chart of the method shown in FIG. 7A, according to an example embodiment.

The methods of FIGS. 7A-7B may be performed by a medical system such as the medical system 10. The calculations and algorithms described with reference to FIGS. 7A-7B may be performed by a control system such as the control system 18. More specifically, processing circuitry within the control system is configured to cause the medical system to perform the functions described herein. If the processing circuitry is a processor, the processor is configured to cause the medical system to perform the functions described herein by executing instructions stored in memory (e.g., storing a neural network or other machine learning based structure).

In some example embodiments, the method of FIG. 7A is performed for every light field, by projecting a MLC shape of a first control point of that field onto the patient. The entry position of the light field is defined in the treatment plan and can be from any direction around the patient. The method of FIG. 7A is used by the treatment system to verify a starting condition for every field in the treatment plan.

At S705, the treatment system obtains a first image. More specifically, the treatment system generates a light field on the patient and the first image includes the light field on a patient. In other words and referring to FIG. 7B, the user of the medical system may instruct the medical system to generate the light field on the patient and the control system activates a light source at S705a (e.g., the light source 130) to project a light field onto the patient. The light field is projected through the collimator and onto the patient.

In some embodiments, a command to generate the light field may be generated external to the treatment system, e.g., when a control device (e.g., the control system) is located in a room separate from the treatment system. In some embodiments, the light source may be activated upon sensing the patient.

Figure 6:
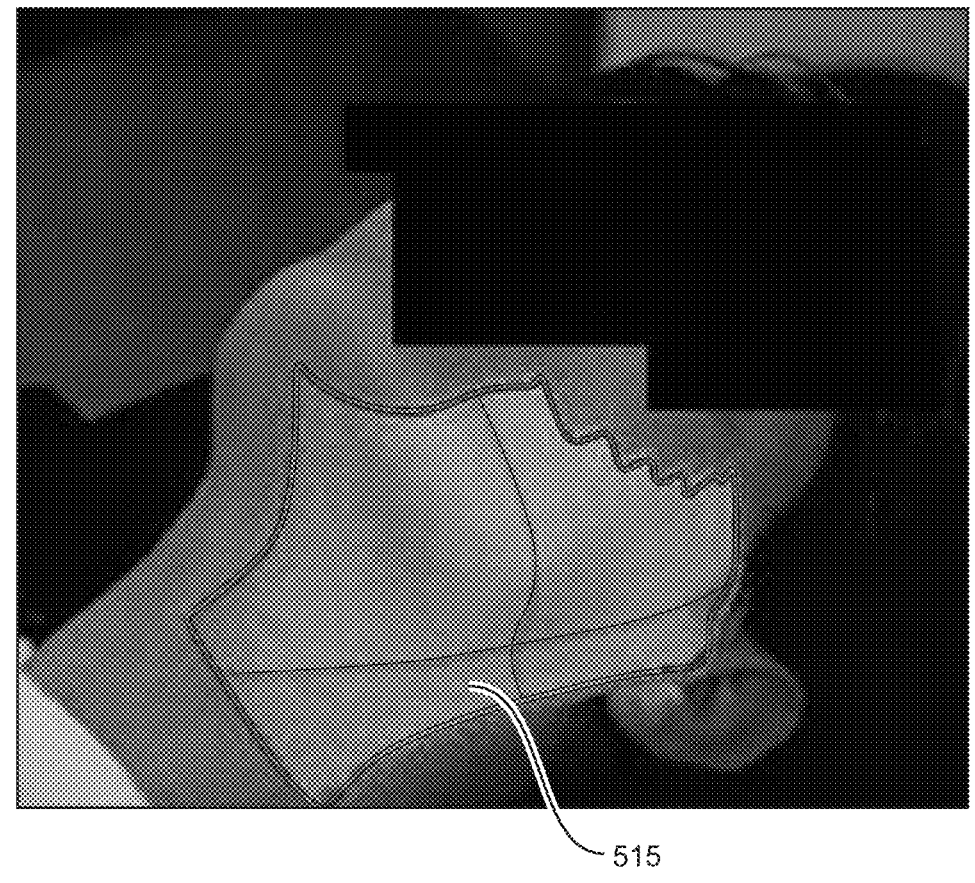
FIG. 6 illustrates a light field area on a patient according to an example embodiment.

The optical system obtains the first image using any of cameras 154. More specifically, the control system 18 obtains the first image using at least one of cameras 154 to capture an image of the patient with the light field on the patient. In some embodiments, the control system 18 controls the at least one camera 154 to capture the first image. In other embodiments, the processing unit 156 controls the at least one camera 154 to capture the first image. The image of the light field on the patient is captured at S705b. FIG. 6 illustrates an example image of the patient with a light field area 515 on the patient.

In some example embodiments, the first image of the patient is a two-dimensional (2D) red-green-blue (RGB) image. In some embodiments, the first image may be a merged image of a plurality of images captured from a plurality of the cameras 154. For example, if the light field on the patient is not fully visible in a single image from the camera, the control system 18 and/or the processing unit 156 combines the single image with at least another image from at least another camera to form the first image including the light field on the patient.

At S705c, the control system detects an outline of the light field on the patient. The outline of the light field is the boundary of the light field on the patient. The control system may detect the outline of the light field using known image processing and edge detection algorithms such as thresholding, gradient and gaussian based edge detection filters. In some example embodiments, the control system may detect the outline of the light field by first performing a Gaussian smoothing of the image, then calculating a gradient of the smoothed image, performing a non-maxima suppression to generate a non-maxima suppressed image and then thresholding the non-maxima suppressed image. As is known, a gradient calculation detects an edge (e.g., an outline of the light field on the patient) intensity and direction. The non-maxima suppression finds pixels on a gradient intensity matrix with a maximum value in the edge directions. The thresholding is a known process used to filter out pixels not relevant to the outline of the light field.

Referring back to FIG. 7A, the treatment system obtains a treatment plan outline at S710. As described above, a 3D patient surface image may be generated using at least one stereo camera 154. The 3D patient surface image may be referred to as a 3D reference surface. Using the 3D patient surface image, the treatment system applies the treatment plan outline to the 3D patient surface. The treatment plan outline includes an area of the patient for treating and corresponds to a field entry shape on the 3D patient surface.

The cameras of the medical system are calibrated against the treatment isocenter of the radiation source. Therefore, the control system knows the locations of the isocenter and of the treatment plan outline relative to the 3D patient surface.

At S715, the control system determines positioning information based on the first image and the treatment plan outline. The positioning information includes an indicator of a position of the treatment system with respect to the patient.

FIG. 7B illustrates S715 in more detail. At S715$a$, the control system projects the treatment plan outline onto the first image.

Figure 8B:
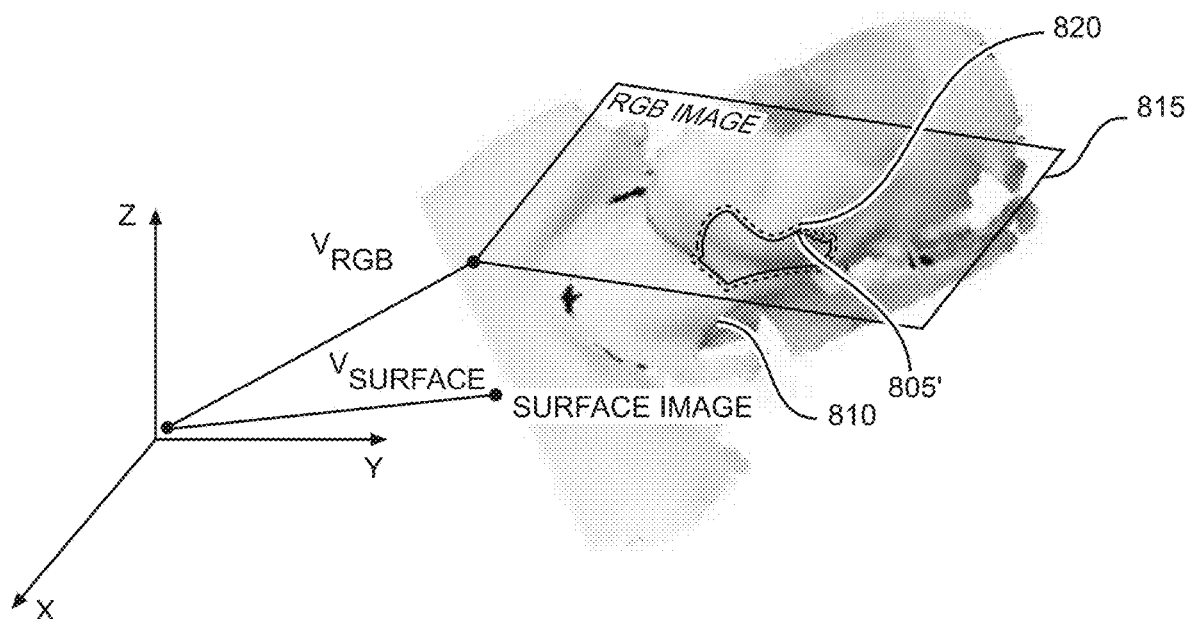
FIG. 8B illustrates a 3D patient surface image being projected to a 2D first image according to an example embodiment.
Figure 8C:
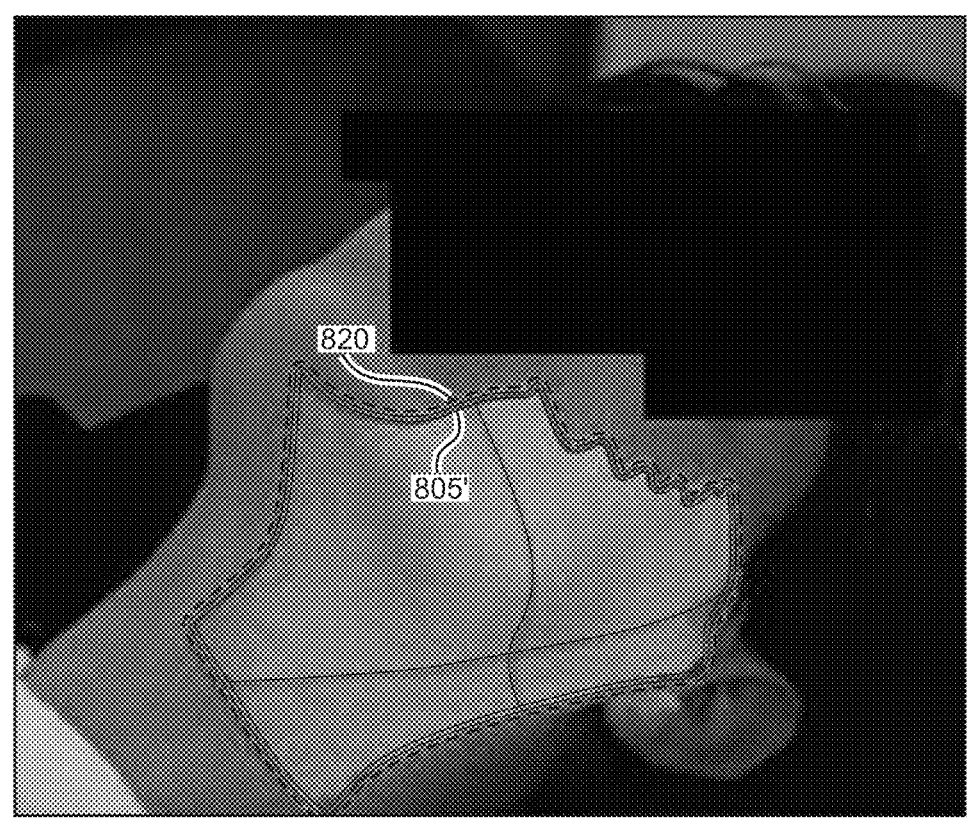
FIG. 8C illustrates a projected treatment plan outline on a 2D first image and a light field outline on the 2D first image according to an example embodiment.

FIGS. 8A-8C illustrate an example embodiment of projecting the treatment plan outline onto the first image. FIG. 8A illustrates a treatment plan outline 805 on a 3D patient surface 810. To determine position information of the treatment plan outline on the 3D patient surface relative to the outline of the light field on the 2D first image, the control system projects the treatment plan outline onto the 2D first image. As shown in FIG. 8B, the 3D patient surface image 810 is registered to a 2D first image 815 using a vector $V_{RGB}$ defining the first image 815 and a vector $V_{surface}$ defining the 3D patient surface image 310.

A treatment plan outline 805' on the 2D image is determined by the control system based on a cross-section of the image plane and a back-projection (from the 3D patient surface 810 toward the 2D first image 815) of the treatment plan outline 805.

Every contour point on the 3D surface is ray-traced back to the beam source. The cross-section of this ray and the RGB image define where the contour points on the 3D surface are located in the RGB image plane. Thus, points corresponding to the treatment plan outline 805 can be transformed to points on the treatment plan outline 805' on the 2D image.

FIG. 8C illustrates the resulting projected treatment plan outline 805' on the 2D first image and the light field outline 820 on the 2D first image.

Referring back to FIG. 8B, the control system then compares the treatment plan outline on the 2D first image to the detected light field outline on the 2D first image at S715$b$.

Figure 9:
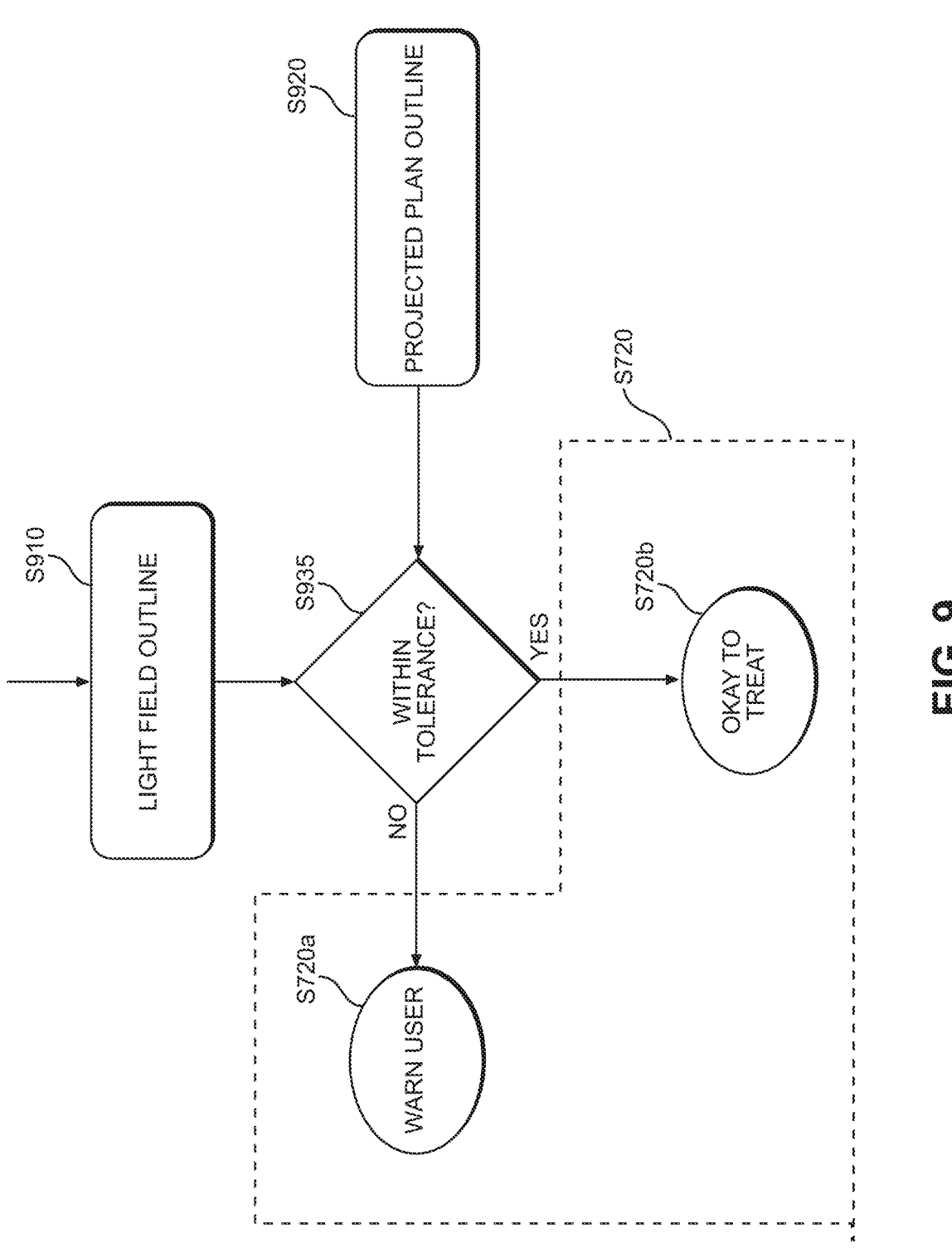
FIG. 9 illustrates an example embodiment of comparing a detected light field to a treatment plan outline on the 2D image.

FIG. 9 illustrates an example embodiment of comparing the detected light field on the 2D image to the treatment plan outline on the 2D image.

At S910, the control system obtains the light field outline on the 2D first image. At S920, the control system obtains the plan outline projected onto the 2D first image.

At S935, the control system determines whether the detected light field on the 2D image and the treatment plan outline on the 2D image are within a threshold tolerance of each other.

In other embodiments, the detected light field outline may be projected onto the 3D patient surface image. The control system may then determine the positioning information based on the outline of the light field on the 3D patient surface and the treatment plan outline on the 3D reference surface.

For example, the positioning information may be determined as a Dice similarity index between the detected light field on the 2D image and the treatment plan outline on the 2D image, calculating a center of gravity for each of the detected light field on the 2D image and the treatment plan outline on the 2D image and computing the geometrical offset (the geometrical offset being the positioning information), measuring an area within the light field outline but not within the treatment plan outline (and/or vice versa) (the area not within the plan outline being the positioning information), a sub-combination thereof or a combination thereof.

The threshold tolerance is based on whichever of the methodologies described above the control system uses, or on more than one methodology as described above. For example, a threshold tolerance could be to keep all edge point candidates that are within a mean pixel value, e.g., within ±25% (of the non-maxima suppressed image).

The threshold tolerance may be based on empirical data and may be adjusted based on treatment room light condition or the skin type of the patient. For example, when a treatment room light condition is relatively darker, the threshold tolerance may be lowered.

Referring back to FIGS. 7A and 7B, at S720 the control system controls the treatment system based on the positioning information. For example, if the positioning information exceeds a tolerance threshold, the control system may cause the treatment system to issue a warning to the user (e.g., at S720$a$ in FIG. 9) and/or prevents the treatment system from performing treatment on the user until the positioning information is within a tolerance threshold.

If the control system determines the positioning information is within the tolerance threshold, the control system may cause the treatment system to proceed with treatment on the patient and/or notify the user that treatment for the patient is permitted (e.g., at S720$b$ in FIG. 9).

Accordingly, example embodiments permit an automated check of the light field and treatment area, increase trust by the user in delivering an accurate field from an accurate treatment direction and the user does not have to enter a treatment room to check the field light.

Figure 10:
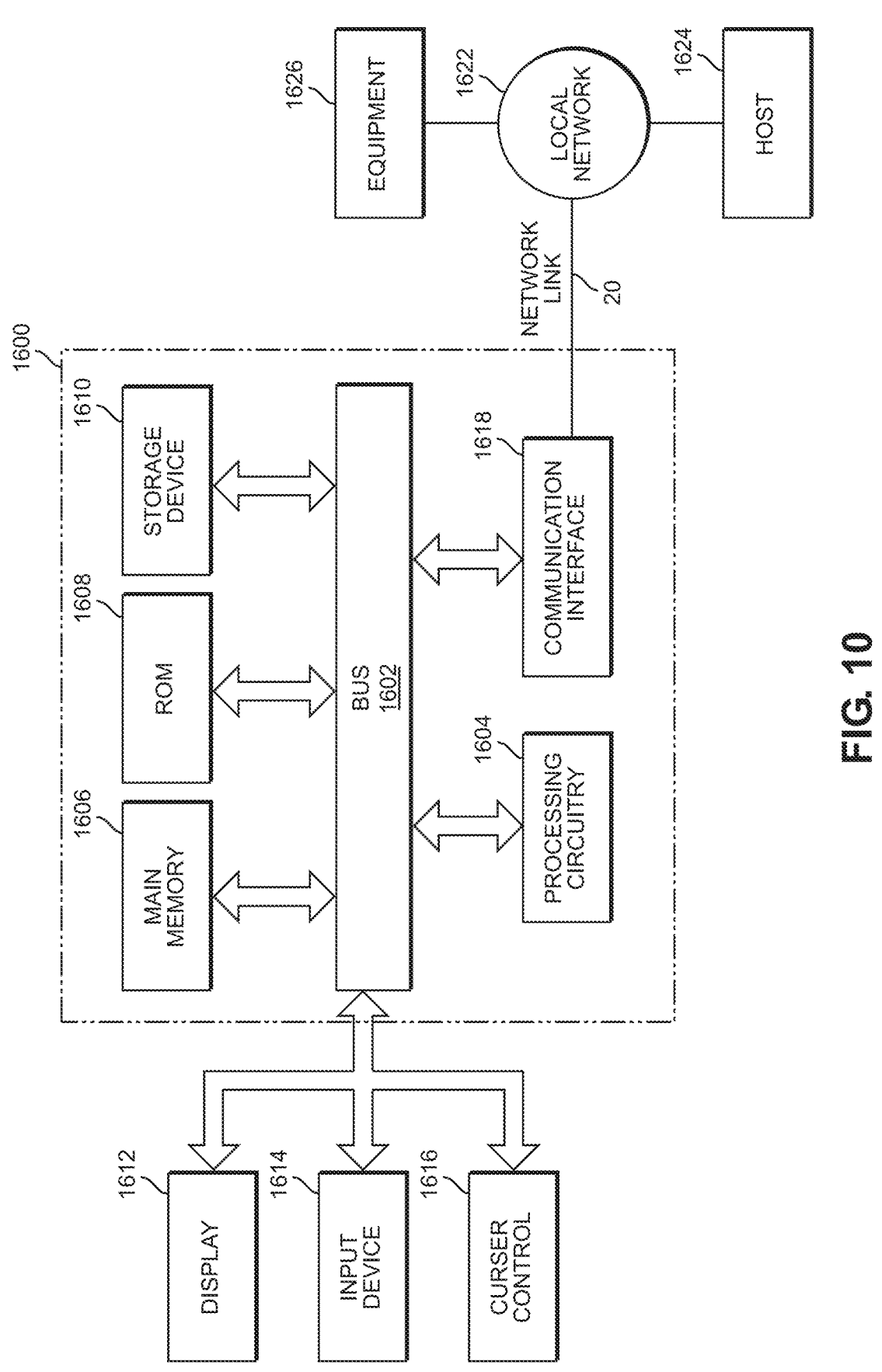
FIG. 10 illustrates a diagram of a control system with which embodiments may be implemented.

FIG. 10 is a block diagram illustrating an embodiment of a specialized control system 1600 that can be used to implement various embodiments described herein. For example, the control system 1600 may be configured to process images from camera(s) 154 in accordance with some embodiments.

Also, in some embodiments, the control system 1600 may be used to implement the processing circuitry 54 and/or the processing unit 156. The control system 1600 may also be an example of any control system described herein.

The control system 1600 includes a bus 1602 or other communication mechanism for communicating information, and processing circuitry 1604 (e.g., at least one processor and/or ASIC) coupled with the bus 1602 for processing information. In examples where the processing circuitry 1604 is hardware configured to executed stored instructions (e.g., a processor), the control system 1600 also includes a main memory 1606, such as a random-access memory (RAM) or other dynamic storage device, coupled to the bus 1602 for storing information and instructions to be executed by the processing circuitry 1604. The main memory 1606 also may be used for storing temporary variables or other intermediate information during execution of instructions to be executed by the processing circuitry 1604. The control system 1600 further includes a read only memory (ROM) 1608 or other static storage device coupled to the bus 1602 for storing static information and instructions for the processing circuitry 1604. A data storage device 1610, such as a magnetic disk or optical disk, may be provided and coupled to the bus 1602 for storing information and instructions.

The control system 1600 may be coupled via the bus 1602 to a display 1612, such as a flat panel, for displaying information to a user. An input/output device 1614, such as a touchscreen, is coupled to the bus 1602 for communicating information and command selections to processing circuitry 1604. Another type of user input device is cursor control 1616, such as a mouse, a trackball, or cursor direction keys for communicating direction information and command selections to processing circuitry 1604 and for controlling cursor movement on display 167. This input device typically has two degrees of freedom in two axes, a first axis (e.g., x) and a second axis (e.g., y), that allows the device to specify positions in a plane.

While the display 1612 and I/O device 1614 are shown outside of the control system 1600, it should be understood that the display 1612 and the I/O device 1614 are part of the control system 1600 such as shown in FIG. 9.

In some embodiments, the control system 1600 can be used to perform various functions described herein. According to some embodiments, such use is provided by control system 1600 in response to the processing circuitry 1604 executing one or more sequences of one or more instructions contained in the main memory 1606. Those skilled in the art will know how to prepare such instructions based on the functions, algorithms and methods described herein. Such instructions may be read into the main memory 1606 from another processor-readable medium, such as storage device 1610. Execution of the sequences of instructions contained in the main memory 1606 causes the processing circuitry 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

Transmission media includes coaxial cables, copper wire and fiber optics, including the wires that comprise the bus 1602. Transmission media can also take the form of acoustic or light waves, such as those generated during radio wave and infrared data communications.

Various forms of processor-readable media may be involved in carrying one or more sequences of one or more instructions to the processing circuitry 1604 for execution. For example, the instructions may initially be carried on a magnetic disk of a remote computer. The remote computer can load the instructions into its dynamic memory and send the instructions over a network, such as the Internet or a local network. A receiving unit local to the control system 1600 can receive the data from the network and provide the data on the bus 1602. The bus 1602 carries the data to the main memory 1606, from which the processing circuitry 1604 retrieves and executes the instructions. The instructions received by the main memory 1606 may optionally be stored on the storage device 1610 either before or after execution by the processing circuitry 1604.

The control system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card or a modem to provide a data communication connection to a corresponding type of telephone line. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626 such as a radiation beam source or a switch operatively coupled to a radiation beam source. The data streams transported over the network link 1620 can comprise electrical, electromagnetic or optical signals. The signals through the various networks and the signals on the network link 1620 and through the communication interface 1618, which carry data to and from the control system 1600, are exemplary forms of carrier waves transporting the information. The control system 1600 can send messages and receive data, including program code, through the network (s), the network link 1620, and the communication interface 1618.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware, for example, processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "memory," "storage medium," "processor readable medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated. According to example embodiments, medical systems, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method comprising:
projecting a light field through a collimator of a treatment system, the light field being projected onto skin of a patient to illuminate a region of the skin of the patient corresponding to a radiation treatment field;
obtaining a first image, the first image including the light field on the patient, the light field being generated by the treatment system;
obtaining a treatment plan outline, the treatment plan outline including an area of the patient for a treatment;
obtaining a three-dimensional (3D) reference surface, the treatment plan outline being projected onto the 3D reference surface and the 3D reference surface being a 3D surface image of the patient;
determining positioning information based on the first image and the treatment plan outline by projecting the treatment plan outline onto the first image, the projecting the treatment plan outline onto the first image including
registering the 3D reference surface to the first image, and
determining a cross-section of each ray of the treatment plan outline with the first image to transform contour points of the 3D reference surface to points on the first image; and
controlling the treatment system based on the positioning information,
wherein the positioning information includes an indicator of a position of the treatment system with respect to the patient.

2. The method of claim 1, wherein
the obtaining the first image includes,
    detecting an outline of the light field on the patient, and
the positioning information is based on the outline of the
    light field on the first image and the treatment plan
    outline on the first image.
3. The method of claim 2, wherein the determining the
positioning information includes,
    comparing the treatment plan outline on the first image
    and the outline of the light field on the first image, the
    positioning information being based on the comparing.
4. The method of claim 3, wherein the first image is a
two-dimensional (2D) image.
5. The method of claim 1, further comprising:
    generating a command to generate the light field, the
    command being generated external to the treatment
    system.
6. The method of claim 1, wherein the obtaining the first
image includes, capturing the first image using a camera of
the treatment system.
7. The method of claim 1, wherein the controlling
includes,
    preventing the treatment when the positioning informa-
    tion is greater than or equal to a threshold.
8. The method of claim 1, wherein the controlling
includes,
    performing the treatment on the patient when the posi-
    tioning information is less than or equal to a threshold.
9. A system comprising:
    processing circuitry configured to cause the system to,
    project a light field through a collimator of a treatment
        system, the light field being projected onto skin of a
        patient to illuminate a region of the skin of the patient
        corresponding to a radiation treatment field
    obtain a first image, the first image including the light
        field on the patient, the light field being generated by
        the treatment system,
    obtain a treatment plan outline, the treatment plan outline
        including an area of the patient for a treatment,
    obtain a three-dimensional (3D) reference surface, the
        treatment plan outline being projected onto the 3D
        reference surface and the 3D reference surface being a
        3D surface image of the patient, determine positioning information based on the first
            image and the treatment plan outline by projecting
            the treatment plan outline onto the first image, the
            projecting the treatment plan outline onto the first
            image including registering the 3D reference surface
            to the first image, and
        determining a cross-section an intersection of each ray
            of the treatment plan outline with the first image to
            transform contour points of the 3D reference surface
            to points on the first image, and
    control the treatment system based on the positioning
        information, wherein the positioning information
        includes an indicator of a position of the treatment
        system with respect to the patient.
10. The system of claim 9, wherein the processing cir-
cuitry is configured to cause the system to,
    detect an outline of the light field on the patient,
    wherein the positioning information is based on the
        outline of the light field on the first image and the
        treatment plan outline on the first image.
11. The system of claim 10, wherein the processing
circuitry is configured to cause the system to,
    compare the treatment plan outline on the first image and
        the outline of the light field on the first image, the
        positioning information being based on the comparing.
12. The system of claim 11, wherein the first image is a
two-dimensional (2D) image.
13. The system of claim 9, wherein the processing cir-
cuitry is configured to cause the system to,
    generate a command to generate the light field, the
        command being generated external to the treatment
        system.
14. The system of claim 9, further comprising:
    a camera configured to capture the first image.
15. The system of claim 9, wherein the processing cir-
cuitry is configured to cause the system to,
    prevent the treatment when the positioning information is
        greater than or equal to a threshold.
16. The system of claim 9, wherein the processing cir-
cuitry is configured to cause the system to,
    perform the treatment on the patient when the positioning
        information is less than or equal to a threshold.

* * * * *